COATING OR PLASTIC.

Patented Sept. 19, 1922.

1,429,451

UNITED STATES PATENT OFFICE.

GEORGE S. PEASE, OF WEST CARROLLTON, OHIO, ASSIGNOR TO JOHN W. LATIMER, OF LAKEWOOD, OHIO.

FIRE-RESISTANT COMPOSITION.

No Drawing. Application filed October 6, 1919. Serial No. 328,769.

*To all whom it may concern:*

Be it known that I, GEORGE S. PEASE, a citizen of the United States, residing at West Carrollton, in the county of Montgomery and State of Ohio, have invented a certain new and useful Improvement in Fire-Resistant Compositions, of which the following is a full, clear, and exact description.

This invention relates to fire-resistant compositions and has for its general object to produce a composition of this character which is capable of economical manufacture, which is light in weight, and which will afford efficient protection against the action of fire and other sources of heat. Other objects and advantages of the invention will be pointed out hereinafter and will be realized in and through the combinations set forth in the claims appended hereto.

In preparing my composition, I take cork or other light material (preferably of a carbonaceous nature, as white wood or cypress) and reduce the same to a size enabling it to pass through a 12-20 mesh sieve. I then intermix these particles with and embed them in a cementitious mass formed by a mixture of substantially equal parts of a saturated solution of a metallic chloride, as magnesium chloride, with an oxide or carbonate (such as calcium oxide, magnesium oxide, or calcium carbonate). The mixture in about these proportions produces a plastic mass of about the consistency of stiff putty. The cork will be added in a proportion which will bring the particles thereof in close proximity to each other, the particles being separated by thin walls of the cementitious material. The resultant mass is then placed in a mold or molds of suitable shape and baked at a temperature of about 300° F. for eighteen to twenty hours, when the compound is dry and hard and the woody particles will have been burned out of the cork. During the baking operation the juice from the cork particles is liberated and serves as a binder to unite the mass. The magnesium chloride will be broken up and, where a metallic oxide is used, each granule will be provided with a thin wall or film of a mixture of such oxide with magnesium oxychloride. The cork particles are enclosed in cells which they only partially fill, due to the shrinkage of such particles by the preliminary heating operation, and this cellular structure of the slab is enhanced by the porosity or cellular nature of the said particles, due to the presence of a high proportion of porous cork in the cemented mass produced by the admixture and treatment of the ingredients in the manner hereinbefore set forth. Furthermore, each slab will contain no ingredient capable of transmitting heat readily through the body thereof. The molds may be so shaped as to produce slabs of varying length, width and thickness, and these slabs will be particularly light in weight and will provide a most efficient fire-proof insulation or protection.

My composition is well adapted for the protection of safes against all ordinary fires. When subjected to a temperature as high as 2000° F., the cork particles or granules in the exterior portions of the slabs will have been consumed and magnesium oxychloride reduced to magnesium oxide, but the cavities or cells remaining after this combustion are partially filled with ash, and the voids or cells are of themselves good non-conductors of heat; hence the efficiency of the composition is not impaired by the reason of the consumption of the cork or other carbonaceous filler, nor by the conversion of the magnesium oxychloride.

Where a carbonate, as calcium carbonate, is employed in place of an oxide, the slabs, after the baking and drying operation, will consist of a cement of magnesium oxychloride and such carbonate having the light carbonaceous particles embedded therein. When such slabs are subjected to a temperature as high as 2000° F. (as in case of a fire) the magnesium oxychloride is reduced as before and the carbonate is also reduced to the oxide, evolving carbon dioxide, which in itself is a fire-extinguisher.

Having thus described my invention, what I claim is:—

1. A fire-resistant composition comprising a cellular mass or body of oxy-chloride cement, the cells in said mass having therein and only partially filling the same particles of non-heat conducting material.

2. A fire-resistant composition comprising a cellular mass of cementitious material containing substantially equal parts of a chloride and an oxide, with carbonaceous material partially filling the voids therein.

3. A fire-resistant composition comprising a cellular mass of cementitious material, each cell having therein and only partially filling the same, a particle of cork from which the woody fibers have been removed.

4. The process of forming a fire-resistant composition which comprises mixing with cementitious material particles of shrinkable carbonaceous material and heating the resultant mixture, thereby to set the cementitious material and to partially shrink the particles therein.

5. The process of forming a fire-resistant composition which comprises mixing particles of cork with cementitious material and heating the mixture to expel the juices from, and to consume only the woody fiber of, the cork.

6. The process of producing fire-resistant composition which comprises mixing carbonaceous particles with a plastic substance formed of substantially equal parts of a metallic chloride and an oxygen-containing compound suitable for forming with the chloride an oxy-chloride cement, and heating the resultant compound gradually thereby to produce a cemented mass and to shrink the carbonaceous particles.

7. The process of producing fire-resistant composition which comprises mixing small cork particles with a plastic mass composed of substantially equal parts of a solution of metallic chloride and an oxygen-containing substance capable of forming with the chloride an oxy-chloride cement, and heating the resultant compound to a temperature of approximately 300° F. until the mass is dried and hardened and the woody ingredients have been burned out of the cork.

In testimony whereof, I hereunto affix my signature.

GEORGE S. PEASE.